J. P. ANAGNOSTOU.
TRICK DRINKING CUP OR GOBLET.
APPLICATION FILED OCT. 16, 1911.
1,030,859. Patented July 2, 1912.
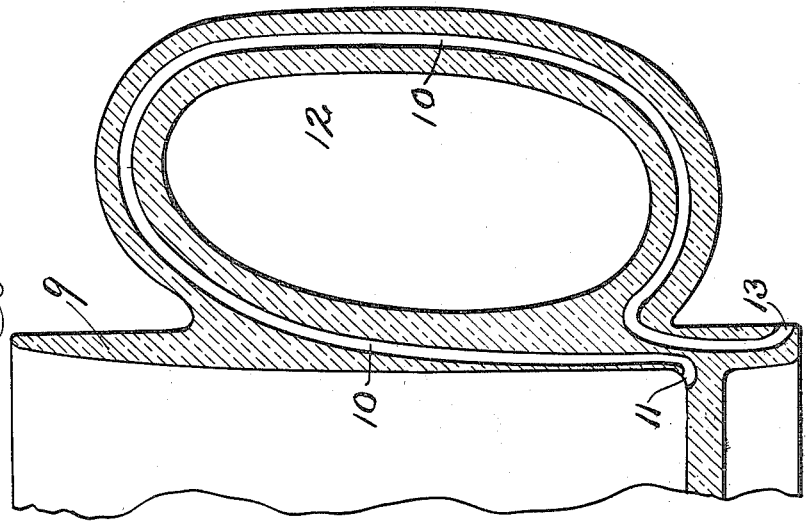
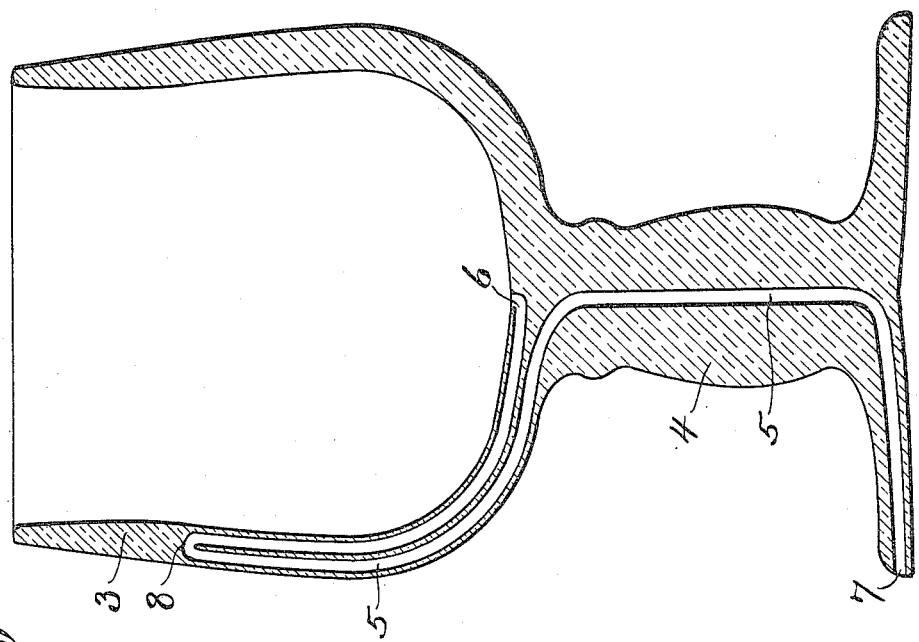
Witnesses:
Inventor:
John P. Anagnostou
By R. J. Jaeller
Atty.

UNITED STATES PATENT OFFICE.

JOHN P. ANAGNOSTOU, OF CHICAGO, ILLINOIS.

TRICK DRINKING CUP OR GOBLET.

1,030,859.  Specification of Letters Patent.  Patented July 2, 1912.

Application filed October 16, 1911. Serial No. 655,439.

*To all whom it may concern:*

Be it known that I, JOHN P. ANAGNOSTOU, a subject of the King of Greece, residing at Chicago, in the county of Cook and State of Illinois, have invented a new and useful Trick Drinking Cup or Goblet, of which the following is a specification.

My invention relates to drinking vessels, used to play a joke on those unacquainted with their construction and the objects of my improvements are first to furnish a perfect drinking vessel, second, to provide means whereby the liquid in the vessel will flow out of the same under certain conditions and other features to become apparent from the description to follow.

This invention is intended to joke persons by pouring liquid into the drinking vessel and having the same flow out of said vessel in a short time so that the vessel will be empty when the person takes it up to drink the contents.

The invention consists of making a passageway in the form of a siphon within the walls of the vessel in such manner that the liquid within the vessel will be siphoned out when a sufficient quantity of liquid is placed in the vessel.

To describe my invention so that others versed in the art to which it pertains can make and use the same I have illustrated it on the accompanying sheet of drawings forming a part of this specification, in which:—

Figure 1, is a central, vertical sectional view of a goblet embodying my invention and Fig. 2, is a similar view showing a modified form partly broken away.

Similar reference characters refer to similar parts throughout both views.

In Fig. 1, 3 is the bowl of the goblet and 4 the base portion. As clearly shown a passageway 5 is formed in the body of the glass or other material forming the goblet having one orifice 6 in the extreme bottom of the bowl communicating with the interior of the bowl 3 and its only other orifice 7 at the extreme lower end of the base 4. As seen the passageway 5 extends from the orifice 6 upward to over half-way up the bowl 3 at which point it returns and extends down through the base 4 to the orifice 7.

When in use the goblet is placed right side up as any ordinary goblet, the liquid is then poured into the same, care being taken to fill the goblet either just below the return point 8 or above the same as desired. It is understood, of course, that if the goblet is filled to a level above the point 8 the liquid will be siphoned out through the passageway 5, and if it is filled to a level below the point 8 the liquid will remain in the goblet.

This invention may also be used as a portion of the paraphernalia of a magician or sleight of hand performer.

In Fig. 2, is illustrated a modified form of my invention shown in connection with an ordinary beer glass 9, and the passageway 10 is made to extend from the orifice 11 in the bottom of the bowl of the glass upward and through the handle 12 and terminates at the orifice 13 at the lower end of the glass.

Having thus fully described my invention what I claim as new and desire to secure by Letters Patent of the United States is:—

In a device of the class described, a suitable vessel with an open top, a hole on the interior of the vessel at the bottom, a hole on the exterior of the vessel at the bottom in a plane lower than the first named hole and a passageway concealed in the body of the vessel a portion of which passageway extends to a plane above said first named hole forming communication between said two holes.

In testimony whereof I have signed my name to this specification in the presence of two subscribing witnesses this 21st day of March 1911 at Chicago, Illinois.

JOHN P. ANAGNOSTOU.

Witnesses:
R. J. JACKER,
GEORGE S. ANDRES.